United States Patent
Dempsey

(10) Patent No.: US 6,203,252 B1
(45) Date of Patent: Mar. 20, 2001

(54) TOOL FOR REBUILDING HOUSING OF TRANSFER CASES

(76) Inventor: James R. Dempsey, HCR 75 Box 4, Sturgis, SD (US) 57785-8903

( * ) Notice: Subject to any disclaimer, the term of this patent is extended or adjusted under 35 U.S.C. 154(b) by 0 days.

(21) Appl. No.: 09/016,662

(22) Filed: Jan. 30, 1998

(51) Int. Cl.[7] .............................. B23B 41/00; B23B 45/14
(52) U.S. Cl. .......................... 408/72 R; 408/79; 408/101; 408/137
(58) Field of Search .................................. 408/72 R, 79, 408/80, 81, 101, 102, 241 B, 137

(56) References Cited

U.S. PATENT DOCUMENTS

| | | | |
|---|---|---|---|
| 334,817 | * | 1/1886 | Spratley ................................ 408/102 |
| 457,708 | * | 8/1891 | Earle ..................................... 408/102 |
| 1,381,101 | | 6/1921 | Albertson . |
| 1,382,835 | | 6/1921 | Johnson . |
| 1,614,691 | * | 1/1927 | Rottler ................................ 408/137 |
| 2,341,969 | * | 2/1944 | Wiesner ............................. 408/72 R |
| 2,688,795 | | 9/1954 | Schwenzfeier . |
| 3,736,067 | * | 5/1973 | Akins ..................................... 408/79 |
| 3,799,687 | * | 3/1974 | Anderson ................................ 408/80 |
| 3,800,391 | * | 4/1974 | Westbrook ............................. 408/79 |
| 4,080,707 | | 3/1978 | Mabry . |
| 4,724,608 | | 2/1988 | Parrott . |
| 4,837,915 | | 6/1989 | Willms . |
| 5,025,556 | * | 6/1991 | Stafford ................................ 408/79 |
| 5,103,548 | | 4/1992 | Reid et al. . |
| 5,165,169 | | 11/1992 | Boyce . |
| 5,213,455 | | 5/1993 | Reynolds . |
| 5,255,435 | | 10/1993 | Shultz . |
| 5,623,761 | | 4/1997 | Chiang . |

\* cited by examiner

*Primary Examiner*—Daniel W. Howell
(74) *Attorney, Agent, or Firm*—Merchant & Gould P.C.

(57) ABSTRACT

A tool is provided for reaming a new bore in the transfer case. The tool has a mounting plate that attaches to the transfer case. A support shoulder projects down from the bottom of the mounting plate. A threaded sleeve is attached to the support shoulder. The threaded sleeve guides a threaded rod with a hex head at one end and a cutting bit at the other end. Once the mounting plate is attached to the transfer case, the cutting bit is aligned with the bore to be reamed in the transfer case. A mechanic can then attach a hex wrench to the hex head at one end of the threaded rod. The mechanic turns the wrench which causes the cutting bit to turn, reaming out a bore in the transfer case. A bushing installer is inserted into the newly reamed bore. Attaching wrenches to both ends of the bushing installer, the mechanic turns the wrenches until the bushing is completely installed in the newly reamed bore.

8 Claims, 2 Drawing Sheets

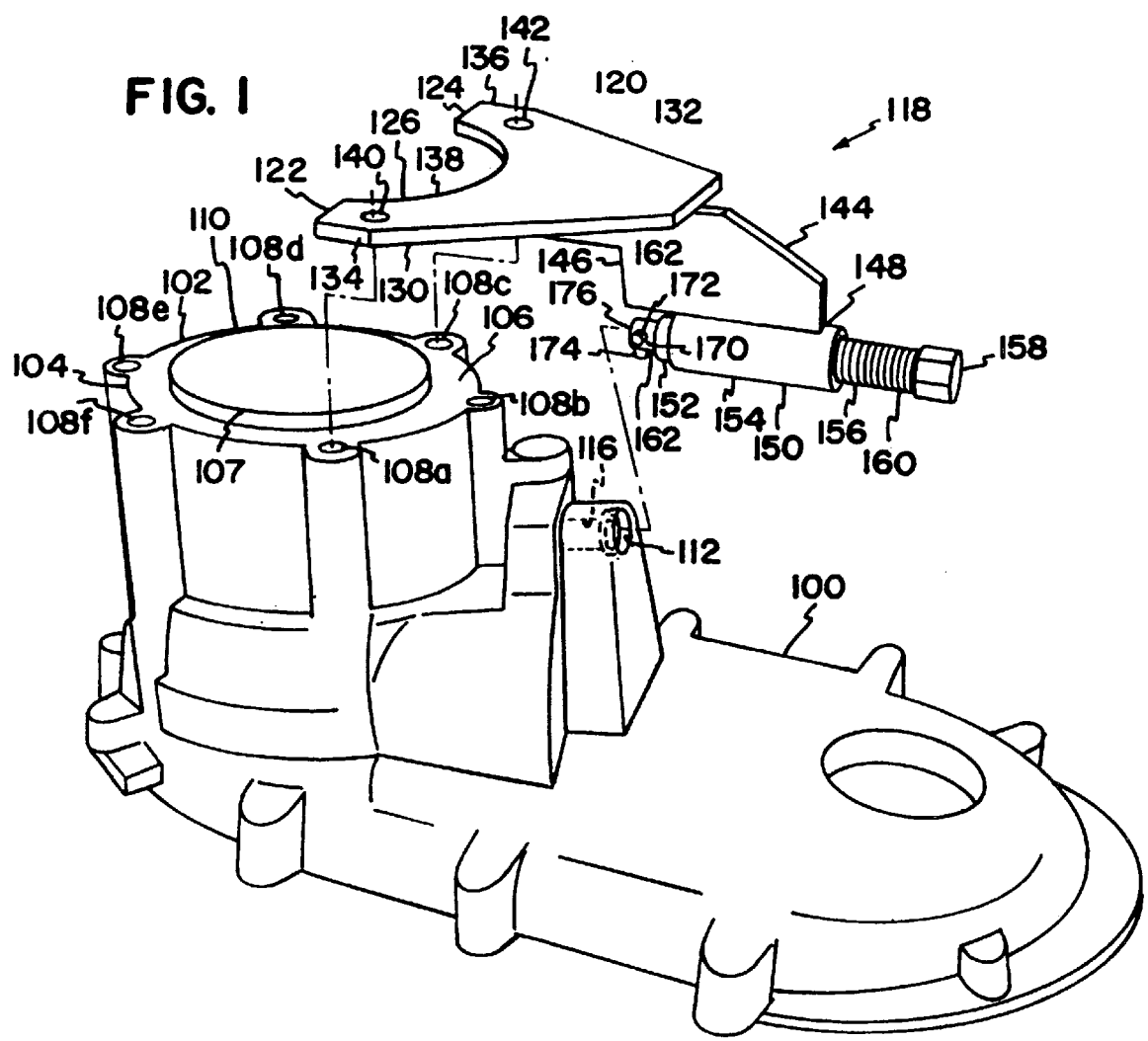

TOOL FOR REBUILDING HOUSING OF TRANSFER CASES

TECHNICAL FIELD

This invention relates to a tool useful in rebuilding the housing of an automobile transfer case, and more particularly, a tool useful in resurfacing a bore in the transfer case.

BACKGROUND

The drive train of an automobile or truck contains components that are used to propel the vehicle. These components may include an engine, transmission, transfer case, drive shafts, differentials, and axles. In a typical automobile, the engine develops torque and transfers this torque to the transmission. The transmission multiplies the torque from the engine and transmits that power to the differential. The differential multiplies the torque from the transmission and divides that torque between the two driving wheels. This power transfer becomes more complicated in four wheel drive vehicles where power is supplied to either one axle or both axles. This is accomplished by attaching a transfer case between the transmission and the drive shafts. The transfer case is a housing containing gears used to distribute the driving power from the transmission to one or both drive shafts of a vehicle equipped with more than one driving axle. The transfer case is equipped with a shift rod connected to some linkage within the transfer case for changing the gear ratio and for engaging or disengaging the front axle from driving. Typically, the rear drive shaft drives full time.

Over time, use of the shift rod causes the housing around the linkage to wear. As the housing becomes worn, the shift rod and linkage become loose. This loose fitting makes it more difficult to shift and causes a loose linkage between the gears in the transfer case that can cause premature wear of the gears and poor performance. When the housing around the linkage becomes worn, the transfer case is typically discarded, and a new transfer case is installed. This replacement is expensive and wasteful.

Therefore, there is a need for an apparatus and method to rebuild the transfer case. There is a further need for an apparatus and method to resurface the bore in the transfer case.

SUMMARY

The present invention is directed to a tool for resurfacing a worn bore in a transfer case housing. The tool comprises an aligning device configured to be attached to the transfer case. A guide is connected to the aligning device. A rod and cutting bit arrangement are connected to the guide. The rod is in axial alignment with the bore when the aligning device is connected to the transfer case.

The present invention is also directed to tool for resurfacing a worn bore in a transfer case housing wherein the transfer case housing has a plurality of bolt holes and a lip. The tool comprises a plate that defines a hole and has a leading edge. The hole is arranged to align with one of the plurality of bolt holes defined in the transfer case. The leading edge is configured to extend around at least a portion of the lip. A sleeve is connected to the plate. A rod and cutting bit arrangement is threaded to the sleeve. The rod is in axial alignment with the bore when the hole in the mounting plate is in alignment with one of the plurality of bolt holes in the transfer case.

The present invention is also directed to a method for resurfacing a worn bore in the housing of a transfer case. The method utilizes a cutting tool that has an aligning device, a threaded rod, and a cutting bit. The method comprises the steps of: attaching the aligning device to the transfer case housing; aligning the threaded rod with the bore; and rotating the threaded rod thereby causing the cutting bit to ream the bore.

The present invention is also directed to a tool for installing a bushing comprises a threaded rod with a head at a first end. A nut is threaded to a second end of the threaded rod. A bushing is coaxial with the threaded rod and positioned between the nut and the head.

BRIEF DESCRIPTION OF THE DRAWINGS

FIG. 1 is an exploded perspective view of a transfer case and a cutting tool for reaming the surface of the bore in the transfer case;

FIG. 2 is a side view of the cutting tool shown in FIG. 1;

DETAILED DESCRIPTION

Figure 3:
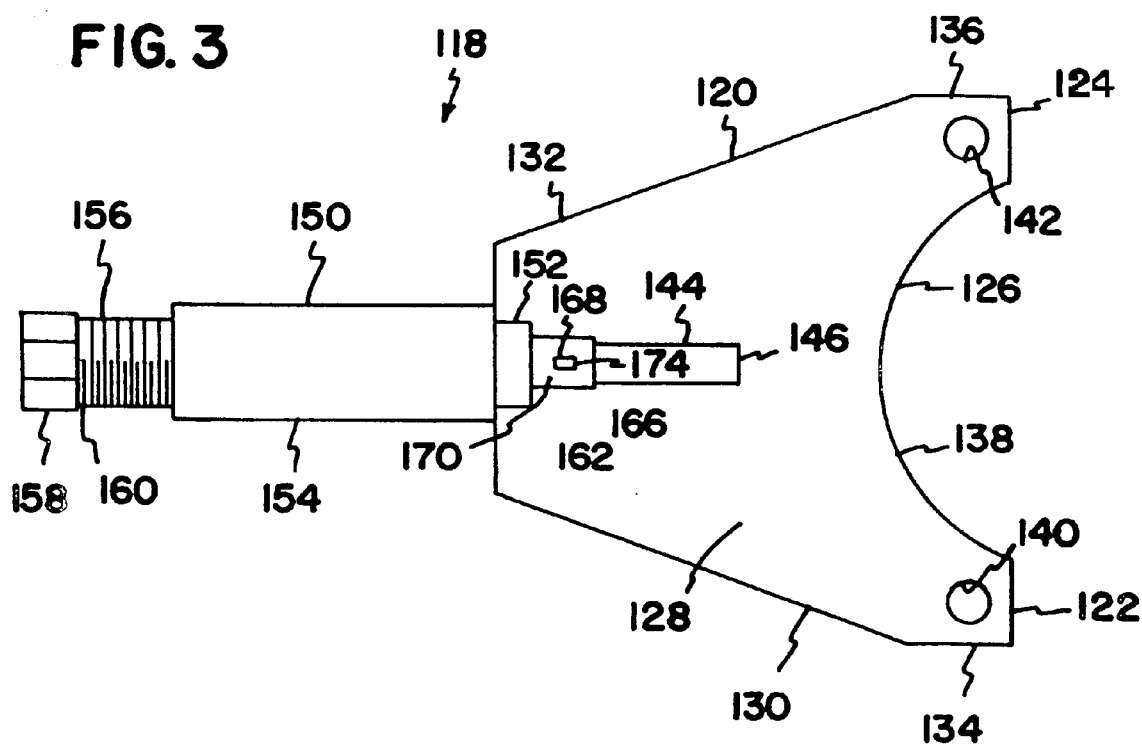
FIG. 3 is a bottom view of the cutting tool show in FIG. 1.

Various embodiments of the present invention will be described in detail with reference to the drawings, wherein like reference numerals represent like parts and assemblies throughout the several views. Reference to the various embodiments does not limit the scope of the invention, which is limited only by the scope of the claims attached hereto.

In general, the present invention is directed to a tool for reaming a new bore in an automobile transfer case. The tool has a mounting plate that attaches to the transfer case and aligns a cutting bit with the bore to be reamed out. A mechanic attaches a hex wrench to the other end of the cutting bit. The mechanic turns the wrench which causes the cutting bit to turn and ream out a bore in the transfer case.

Referring now to FIG. 1, a transfer case for 4-wheel drive vehicles has a housing 100 that has a cylindrical portion 102 for housing gears (not shown). The end 104 of the cylindrical portion 102 has a machined surface 106 that is flat and smooth. A circular lip 107 extends from the machined surface 106. The cylindrical portion 102 also defines a plurality of bolt holes 108a–108f. The bolt holes 108a–108f are positioned intermittently around the lip 107 and open to the machined surface 106.

The cylindrical portion 102 of the housing has a side wall 110 that defines an annular recess 112 at its outer surface 114. A bore 116 is formed in the side wall 110 of the housing's cylindrical portion 102. The bore 116 is concentric with and opens into the annular recess 112. When the transfer case 100 is placed in a vehicle, a shift rod (not shown) extends through the annular recess 112 and the bore 116. The shift rod provides a linkage between the gearing in the cylindrical portion of the transfer case housing and the shifting lever (not shown) that extends into the cab of the vehicle.

Although the following embodiment is described in terms of the transfer case housing 100 shown in FIG. 1, alternative configurations of the cutting tool described below can be used with other transfer case housing designs.

Referring now to FIGS. 1–3, a cutting tool, generally shown as 118, includes an aligning device, which in one possible embodiment is a flat mounting plate 120. The mounting plate 120 has first and second flanges 122 and 124 that extend forward and are positioned on opposite sides of the mounting plate 120. The mounting plate 120 has a leading edge 126, a bottom surface 128, a first side 120, and a second side 132. The leading edge 126 has a first straight portion 134 that extends from the first side 130, a second straight portion 136 that extends from the second side 132, and a semicircular portion 138 that extends between the first and second straight portions 134 and 136. The portion of the mounting plate 120 that is proximal the leading edge 126, including the first and second flanges 122 and 124, form a shoulder configured to rest against the machined surface 106 of the housing cylindrical portion 102.

A first mounting hole 140 is defined proximal the first straight portion 134 of the leading edge 126 and between the semicircular portion 138 of the leading edge 126 and the first side 130. A second mounting hole 142 is defined proximal the second straight portion 136 of the leading edge 126 and between the semicircular portion 138 of the leading edge 126 and the second side 132. The first and second mounting holes 140 and 142 are positioned to align with two of the bolt holes 108a and 108c in the transfer case housing 100 when the semicircular portion 138 of the leading edge 126 mates with the lip 107 on the transfer case housing 100.

A flange 144 projects downward from the bottom 128 of the mounting plate 102, and has a leading edge 146 and a bottom edge 148. The leading edge 146 of the flange 144 is set back from the leading edge 126 of the mounting plate 120. This configuration permits the semicircular portion 138 of the leading edge 126 for the mounting plate 120 to be positioned proximal the lip 107 of the transfer case housing 100 while the leading edge 146 of the flange 144 extends along the side wall 110 of the housing's cylindrical portion 102.

A guide, which in one possible embodiment is threaded sleeve 150, is attached to the bottom edge 148 of the flange 144. The threaded sleeve 150 has a first portion 152 that has a first outer diameter and a second portion 154 that has a second outer diameter. The first portion 152 is positioned proximal the leading edge 146 of the flange 144. The first outer diameter is smaller than the second outer diameter. The first outer diameter is sized so that the first portion 152 of the threaded sleeve 150 fits within the annular recess 112 of the transfer case housing 100.

A rod 156 is threaded and passes through the threaded sleeve 150. A hex head 158 is formed at one end 160 of the rod 156. A boring bar 162 extends from an oppositely disposed end 164 of the rod 156 and is in axial alignment with the rod 156. The boring bar 162 has an exposed end 166 that is oriented toward the leading edge 126 of the mounting plate 120. A first hole 168 is defined in the exposed end 166 of the boring bar 162 and extends radially through the boring bar 162 from the surface 170 to a position proximal or slightly past the axis of the boring bar 162. A second hole 172 is also defined in the exposed end 166 of the boring bar 162. The second hole 172 is threaded, radially oriented, perpendicular to the first hole 168, and passes between the surface 170 of the boring bar 162 and the first hole 168.

A cutting bit 174 is positioned in and projects from the first hole 168. A set screw 176 is threaded into the second hole 172 such that it clamps down on the cutting bit 174 and holds the cutting bit 174 in place. This configuration allows the cutting bit 174 to be replaced as it wears over time.

Figure 4:
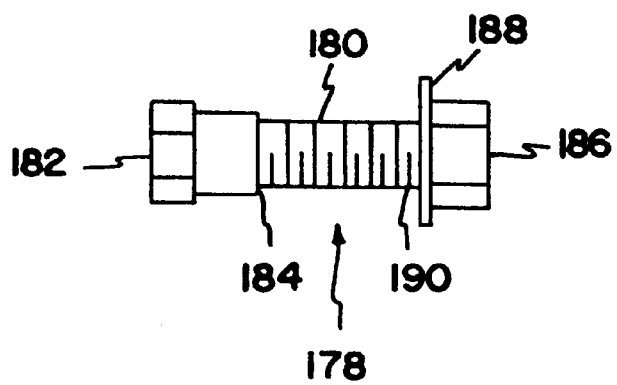
FIG. 4 is a side view of a bushing installer.

Referring now to FIG. 4, a bushing installer, generally shown as 178, includes a threaded rod 180 that has a hex head 182 at a first end 184. A hex head nut 186 and buffer washer 188 are attached to the threaded rod 180 at a second end 190.

Referring to FIGS. 1 and 4, the cutting tool 118 is used as follows. A mechanic removes the transfer case from a vehicle and then removes the forward housing 100 from the transfer case. The mechanic then attaches the cutting tool 118 to the front half of the housing 100 by inserting the first portion 152 of the threaded sleeve 150 into the annular recess 112 of the housing 100. In this position, the second portion 154 of the threaded sleeve 150 butts up against the side wall 110 of the housing's cylindrical portion 102. Additionally, the mounting plate 120 rests on the machined surface 106, and the mounting holes 140 and 142 are aligned with two of the bolt holes 108a and 108c on the housing 100. The mounting plate 120 is then bolted to the housing 100 with bolts that pass through the mounting holes 140 and 142 and into the bolt holes 108a and 108c. In this position, the boring bar 162 is in axial alignment with the bore 116 that passes through the side wall 110 of the housing's cylindrical portion 102.

The mechanic can then attached a wrench to the hex head 158 of the rod 156 and turn the rod 156 so the boring bar 162, and hence the cutting 174 bit rotate and enter into the bore 116. The mechanic continues turning the threaded rod 156 until the cutting bit 174 passes through the entire length of the bore 116 and cuts away substantially the entire surface of the bore 116. The cutting bit 174 removes the inner surface of the bore 116 and widens the bore 116. The cutting tool 118 is then removed from the housing 100.

A bushing (not shown) is then aligned with the bore 116. The bushing has an outer diameter that is approximately the same as the reamed out bore 116 and a thickness that is approximately the same the depth of the material that was reamed from the bore 116. The threaded rod 180 of the bushing installer 178 is inserted through the bore 116 and the bushing, and the nut 186 and buffer washer 188 are attached to the second end of the threaded rod 180. The surface of the hex head 182 of the threaded rod 180 and the buffer washer 188 are larger than the inner diameter of the bushing.

The mechanic then attaches a wrench to the hex head 182 of the threaded rod 180 and a wrench to the nut 186. The nut 186 is then tightened, which drives the bushing into the bore 116. The bushing provides a rebuilt surface for the bore 116 and permits the transfer case 100 to be reused either in the same vehicle or another vehicle.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A tool, for resurfacing a worn bore in a transfer case housing, having a bolt hole for attachment to the transfer case, the bolt hole having an axis, the tool comprising:
   an aligning device configured to be attached to the transfer case, the aligning device defining a mounting hole, the mounting hole having an axis;
   a guide connected to the aligning device, the guide having an axis, the guide axis being orthogonal to the mounting hole axis; and
   a rod and cutting bit arrangement connected to the guide wherein the rod is in axial alignment with the bore when the aligning device is connected to the transfer case and the mounting hole opposes the bolt hole in the transfer case.

2. The tool of claim 1 wherein the transfer case housing has a plurality of bolt holes and the aligning device includes a plate, the plate defining a plurality of mounting holes, each hole being arranged to align with one of the plurality of bolt holes defined in the transfer case.

3. A tool for resurfacing a worn bore in a transfer case housing, the transfer case housing having a plurality of bolt holes, the tool comprising:

an aligning device configured to be attached to the transfer case, the aligning device defining a plate, the plate defining a hole, the hole being arranged to align with one of the plurality of bolt holes defined in the transfer case;

a guide connected to the aligning device;

a rod and cutting bit arrangement connected to the guide wherein the rod is in axial alignment with the bore when the aligning device is connected to the transfer case; and wherein the transfer case has a circular lip and the plate has a leading edge, the leading edge configured to extend around at least a portion of the lip.

4. The tool of claim 1 wherein the guide is a threaded sleeve.

5. The tool of claim 1 further comprising a flange extending between the mounting plate and the sleeve.

6. The tool of claim 1 further comprising a boring bar, the boring bar being in axial alignment with and extending from an end of the rod, wherein the bit is connected to the boring bar.

7. The tool of claim 6 wherein the bit is removably connected to the boring bar.

8. A tool for resurfacing a worn bore in a transfer case housing, the transfer case housing having a plurality of bolt holes and a lip, the tool comprising:

a plate, the plate defining a hole and a leading edge, the hole being arranged to align with one of the plurality of bolt holes defined in the transfer case, the leading edge configured to extend around at least a portion of the lip;

a sleeve connected to the plate; and a rod and cutting bit arrangement threaded to the sleeve wherein the rod is in axial alignment with the bore when the hole in the mounting plate is in alignment with the one of the plurality of bolt holes in the transfer case.

* * * * *